United States Patent [19]

Braida, Jr.

[11] 4,339,060
[45] Jul. 13, 1982

[54] BATTERY BRACKET FOR BICYCLES

[76] Inventor: Richard L. Braida, Jr., 1104 Cherry Point Rd., West River, Md. 20881

[21] Appl. No.: 239,993

[22] Filed: Mar. 3, 1981

[51] Int. Cl.³ .......................................... B62J 11/00
[52] U.S. Cl. ................................ 224/32 R; 224/39; 248/313
[58] Field of Search .................... 224/32 R, 30 A, 35, 224/36, 37, 38, 39, 40, 41, 902, 282; 248/313; 136/230

[56] References Cited

U.S. PATENT DOCUMENTS

| | | | |
|---|---|---|---|
| 559,801 | 5/1896 | Hoffman | 362/72 |
| 675,390 | 6/1901 | Keating | 224/32 R |
| 965,436 | 7/1910 | Brott | 224/41 |
| 1,439,430 | 12/1922 | Lyhue | 362/72 |
| 1,723,147 | 8/1929 | Fourethier | 224/902 |
| 4,009,810 | 3/1977 | Shook | 224/32 R X |

FOREIGN PATENT DOCUMENTS 23194 of 1898 United Kingdom ............. 224/30 A

OTHER PUBLICATIONS

Master-Line, Easy-Glide Products.

Primary Examiner—Steven M. Pollard

[57] ABSTRACT

Battery bracket for bicycles and the like including a means for preventing lateral movement of the battery, a first L-shaped frame member for accepting one end portion of a battery, and a second L-shaped jaw member for engaging the opposite end portion of a battery, said second L-shaped jaw being adapted to pivot from a first position to receive the battery and a second position for locking the battery in place within the first L-shaped frame.

12 Claims, 4 Drawing Figures

– 4,339,060 –

BATTERY BRACKET FOR BICYCLES

BACKGROUND OF THE INVENTION

1. Field of the Invention

The present invention relates to an improved battery support bracket and more particularly to a support bracket for removeably securing a battery to a tubular bicycle frame.

2. Description of the Prior Art

Heretofore, arrangements for supporting batteries on the tubular frame members of a bicycle have consisted of leather or fabric cases with adjustable straps, closed metal tubes, or wire frames with pivotally attached resilient metal clips which engage opposite sides of the battery casing. These devices suffer from two major disadvantages: First, the recharging or replacement of discharged batteries is an inconvenient and tedious task requiring partial disassembly of the battery support means in many cases, or manual disconnection and reconnection of the battery from the attached electrical circuit. Second, the prior art devices fail to deter theft of the battery from the bicycle when it is left locked and unattended.

SUMMARY OF THE INVENTION

According, it is the general purpose and object of the present invention to provide a battery bracket for bicycles in which a battery secured to a bicycle frame is quickly and easily removeably installed.

Another object of the present invention is to provide a battery bracket for bicycles which deters unauthorized removal or theft of the battery from an unattended bicycle.

Another object of the present invention is to provide bracket for bicycles which is ruggedly built yet lightweight, easy to manufacture, and which does not detract from the general appearance of the bicycle.

Another object of the present invention is to provide a battery bracket for bicycles which may be attached to bicycle tubular frames or different diameters.

Further objects of the invention are to provide a battery bracket for bicycles which comprises a metal or plastic structure formed to provide for convenient removeable installation and theft-resistant locking of a battery support thereby.

These and other objects are accomplished within the present invention by providing a bracket comprising an L-shaped frame with an opposing L-shaped jaw pivotally mounted to one end of the frame so that the bracket defines a rectangular space in cross-section, within which a battery is secured. A latching means is attached to one end of the jaw to allow releaseable engagement with a portion of one leg of the frame. A pair of spaced parallel arms join either side of one leg of the frame to the corresponding side of the other leg of the frame; the arms being spaced horizontally so as to allow receipt of a battery therebetween. The arms lend rigidity to the frame, while simultaneously securing the battery against lateral movement. The other leg of the frame is of curved shape to allow receipt of a tubular frame element. The leg is secured to the tubular frame with a conventional hose clamp or a modified clamp described more fully hereinafter. In the modified construction, access to the clamp screw is restricted solely to the face of the screw. In addition, the clamp is arranged so that the face of the clamp screw is obscured behind the rear of the battery locked in the bracket; thus unauthorized removal of the bracket from the support surface is deterred.

The foregoing objects and features together with numerous advantages of the present invention will be better understood from the following detailed description of a preferred embodiment taken in connection with the accompanying drawings.

DETAILED DESCRIPTION

The present invention is disclosed in detail for use with a battery having compression spring terminals, however such disclosure is made for descriptive purposes only and is not intended to limit the scope or utility of the novel bracket disclosed and claimed herein.

Figure 1:
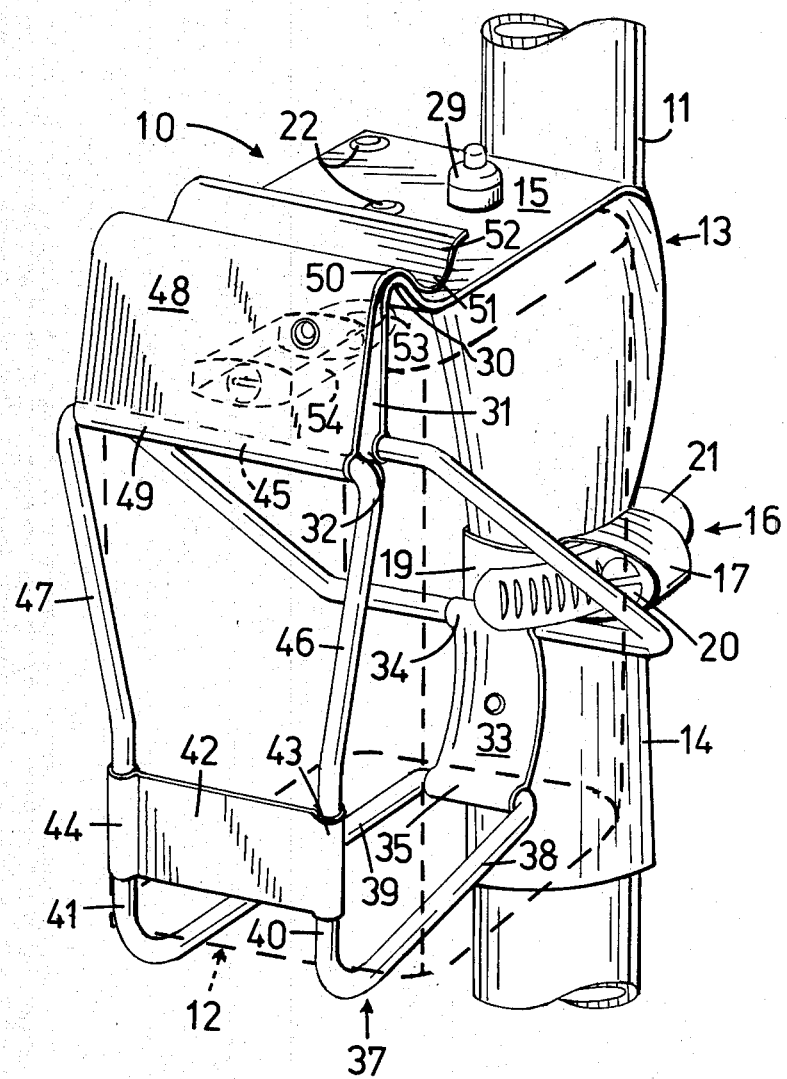
FIG. 1 is a perspective view of a fragmentary portion of a bicycle frame illustrating the manner in which the novel battery bracket may be mounted to support a battery in accordance with the present invention.

As shown in FIG. 1, the bracket of the present invention is designated generally by the numeral 10 and is adapted to be mounted to a tubular frame element 11 of a bicycle and to carry a portable battery 12 as shown in phantom lines. The bracket 10 as shown in FIG. 1 may be attached to a frame element 11 such as the seat tube or any other tubular element of the bicycle frame.

Figure 2:
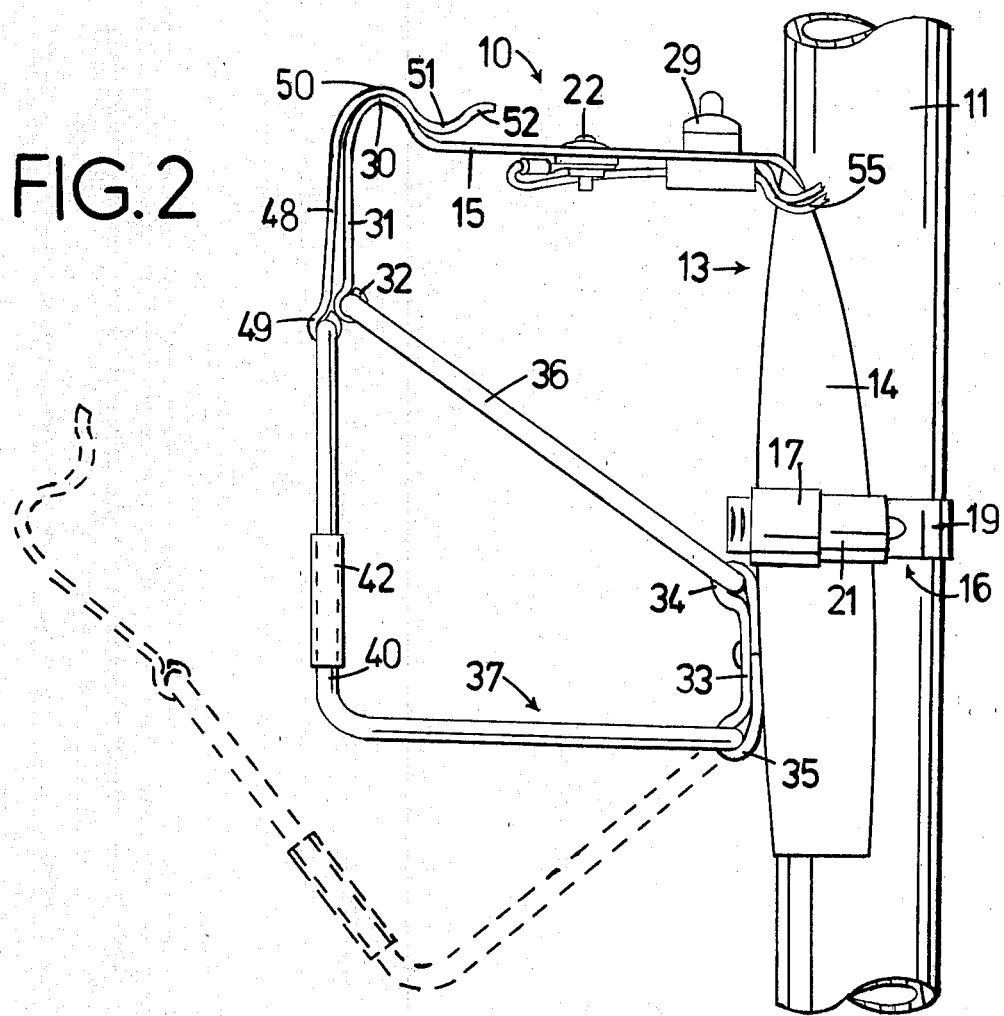
FIG. 2 is a side view of the bracket of FIG. 1 with the battery and padlock removed, showing the jaw in phantom lines in an open position and a pair of electrical leads connected to the bracket.

Referring to FIGS. 1 and 2, the bracket 10 includes an L-shaped frame 13 having a leg member 14 shaped to conform to a typical exterior surface of a frame element 11 of a conventional bicycle. The leg member 14 gradually flares from its shaped section into a flat section which forms a second leg 15 of the L-shaped frame 13. When placed in position, the shaped leg member 14 is secured to the frame element 11 by a supporting clamp 16 in a conventional manner.

Figure 3:
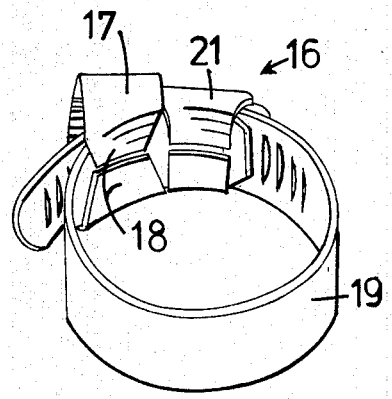
FIG. 3 is a perspective view of the modified bracket clamp showing a shroud surrounding the head of the clamp screw.

As shown in FIGS. 1, 2, and 3, the clamp in its preferred embodiment includes a shroud 17 comprising a narrow strip of sheet metal formed into a U-shape with a pair of legs 18 bent diagonally and inwardly toward the inside of the clamp. The shroud 17 is fitted over a clamp band 19 and the head of a worm screw 20 so that no portion of the worm screw 20 protruding from a screw housing 21 is laterally accessible. The arcuate legs 18 seat against the inside surface of the clamp band 19 adjacent to the worm screw housing 21.

Figure 4:
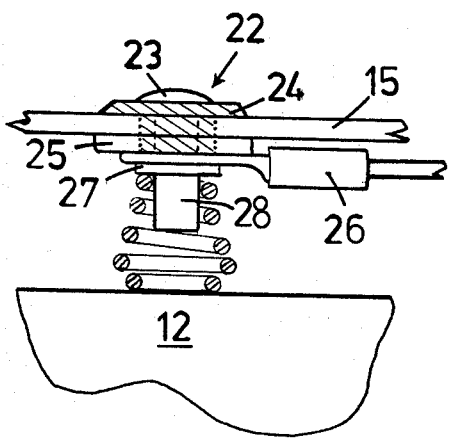
FIG. 4 is a side cross-sectional view of a preferred battery terminal contact for the present invention.

The second leg 15 extends substantially perpendicularly from the first leg and includes a pair of battery terminal contacts 22 fastened thereto and strategically located to align the contacts 22 with a pair of compression spring terminals of the battery 12 supported in bracket 10. Referring to FIG. 4, the contacts 22 may comprise a pop rivet 23 held in a plastic insulating jacket 24 which extends through a hole in the second leg 15 and through an insulating washer 25. Below the insulating washer 25 is a solderless wire terminal 26 and a metal washer 27 secured by a downwardly protruding shank portion 28 of the pop rivet 23. One of the two solderless terminals 26 is electrically connected to a circuit-breaking switch 29 which is fastened to the second leg 15 adjacent to the contacts 22. The other terminal 26 and the switch 29 are each connected to power leads 55 to allow discharging of the battery 12 supported in bracket 10. At the forward end of the second leg 15 is an inverted U-shaped ridge 30, from which a forward leg 31 extends downward, substantially parallel to the first leg 14, and terminates in an inwardly folded knuckle 32.

An elongated support band 33 as shown in FIGS. 1 and 2, is attached to the first leg 14 of the L-shaped frame 13, and includes at each end thereof a pair of rearwardly-bent knuckles 34,35. The upper knuckle 34 serves to support one end of a continuous wire strut 36 what includes a pair of spaced parallel arms which restrict lateral movement of the battery within the L-shaped frame 13. The strut projects upwardly and outwardly from first leg 14 and is attached at its other end to knuckle 32 of second leg 15. A generally L-shaped jaw 37 is pivotally engaged to the lower knuckle 35 of the support band 33, and is formed from a single piece of material which includes a latch 48 pivotally attached to the free end thereof. The jaw 37 may be formed from a continuous wire rod which includes a first portion pivotally attached to knuckle 35, a pair of legs 38, 39 extending forwardly therefrom, a pair of arms 40, 41 arranged at substantially a right angle to legs 38, 39 and a second portion 45 to which latch 48 is attached. The upper portions of arms 40, 41 include a brace 42, formed of a sheet material, each end of which includes knuckles 43, 44 engaging the corresponding legs 40 and 41. Continuing from legs 40, 41 are a pair of extensions 46, 47 which diverge from eachother in the same plane and include the second portion 45 to which latch 48 is pivotally attached by means of a knuckle 49. At the free end of latch 48 is a pleat-like configuration having a first pocket 50 and a second pocket 51, the pocket 50 being adapted for engaging the transverse ridge 30 formed in the second leg 15. Extending obliquely toward the support surface from the pocket 51 is an extension 52 which forms a finger grip for grasping latch 48.

Latch 48 and leg 31 are each provided with openings through which the U-shaped shackle 53 of a small padlock 54 may be passed for securing the elements together.

In use, the first leg 14 is secured to the tubular frame of a bicycle by a clamp 21 as shown in FIG. 1. The clamp 21 is installed around the first leg member 14 so that the face of the clamp screw 20 is oriented against the back of the battery 12 and obscured thereby, thus preventing the bracket from being removed from the bicycle frame as long as the battery is locked in place. The battery 12 is inserted into the bracket 10 by fitting the upper end containing the compression spring terminals through the strut 36 so that the battery terminals seat against the corresponding contacts 22 fastened through the second leg 15. The battery 12 is then brought generally parallel to the first leg member 14 and the jaw 37 is swung upwardly until the latch 48 may be pivoted inwardly to catch behind the inverted U-shaped ridge 30 as shown in FIG. 2. In this position the jaw 37 yieldingly embraces the bottom of the battery 12 and holds the battery 12 snugly against the terminal contacts 22 and tangent to at least one of the knuckles 30 and 32 while the strut 36 secures the battery 12 against lateral movement and provides structural support for the bracket frame 13.

Removing the battery is a simple matter of pulling on the finger piece 52 to withdraw the pocket 50 of the latch 48 from behind its extension 30; pivoting the latch 48 outwardly around the second portion 45 and then swinging jaw 37 down about the horizontal knuckle 35 as a pivot; allowing the battery 12 to drop from the bracket 13.

In its preferred embodiment it will be seen that the bracket consists of but six metal parts: the frame 13, the support band 33, the strut 36, the jaw 37, the brace 42, ahnd the latch 48, plus a pair of battery terminal contacts 22, and a circuit-breaking switch 29. In addition, a rubber or plastic gasket material may be attached to the exterior surface of the backing member 14 for applying a strong gripping or nonslipping force to the tubular support surface, absorbing some vibration, and serving to protect the finish of the support surface from marring.

While the invention herein shown and described is what is presently conceived to be the most practical and preferred embodiment, it will be obvious to one of ordinary skill in the art that many modifications may be made thereof within the scope of the appended claims. Moreover while the present invention has been specifically described for use on a bicycle, it is obvious that it could be used in many other environments when modified accordingly. Thus while other modifications are also possible, it is intended that the invention be accorded the broadest scope of the attached claims so as to encompass all equivalent structures and devices.

I claim:

1. A support bracket for a battery mounted on a bicycle frame or the like, said bracket comprising:
   (a) a generally L-shaped frame with a means for attaching the first leg of said frame to a support surface;
   (b) a generally L-shaped jaw connected to said first leg, the two members in combination defining a generally rectangular space in cross-section within which a battery is secured;
   (c) a latching means, depending from the free end of the jaw for releasably engaging the second leg of said frame; and
   (d) a pair of spaced parallel arms arranged on each side of the rectangular space formed by the two members for restricting the lateral movement of a battery supported in said bracket.

2. The support bracket of claim 1 wherein the second leg of said generally L-shaped frame is formed from an elongated strip of sheet material, the forward portion of which includes a transverse U-shaped ridge with an inwardly facing pocket, the free end extending downwardly in parallel relation to the first leg member and terminating in an inwardly folded transverse knuckle.

3. The support bracket of claim 2 wherein a support band formed from an elongated strip of sheet material is attached to the first leg of said L-shaped frame and includes inwardly folded knuckles at either end thereof.

4. The support bracket of claim 3 wherein the spaced parallel arms arranged on each side of the battery space are formed from a continuous piece of rod-like material with portions attached to one of the knuckles of said support band and to the second leg of said L-shaped frame member.

5. The support bracket of claim 4 wherein said L-shaped jaw is formed from a continuous piece of rod-like material, one portion of which is attached to the other knuckle of said support band, said material being shaped to include a pair of legs which extend outwardly from said knuckle, a pair of arms arranged at substantially a right angle to said legs and another portion which includes a latch element.

6. The support bracket of claim 5 wherein said latch element comprises a pleat-like configuration, one end of which is attached to the other portion of said L-shaped jaw and the other end of which includes a first pocket and a second pocket, the first pocket being adapted to engage the U-shaped transverse ridge of the second leg of said L-shaped frame, the free end of the second pocket extending obliquely toward the support surface to form a finger grip.

7. The support bracket of claim 6 wherein the first leg of said generally L-shaped frame is shaped to conform with a typical exterior surface of a frame element of a conventional bicycle, the upper portion of said leg flaring from its shaped section into a flat section which forms the second leg of the L-shaped frame.

8. The support bracket of claim 7 further comprising a pair of battery terminal contacts fastened to the second leg member and strategically located to align with a pair of compression spring battery terminals of a conventional battery supported in the bracket, and a circuit-breaking switch attached adjacent to the battery terminal contacts.

9. A support bracket as in claim 1 wherein the means for attaching said first leg member to said support surface comprises a hoseclamp, said hoseclamp including a shroud fitted over a clamp band and the head of a worm screw so that no portion of the worm screw protruding from a screw housing is laterally accessible.

10. A support bracket of claim 9 wherein the shroud fitted over the clamp band comprises a U-shaped strip of sheet material with legs bent diagonally and inwardly toward the inside of the clamp adjacent to the worm screw housing.

11. A support bracket as in claim 10 wherein the latch and the free end of the transverse ridge are each provided with openings through which the U-shaped shackle of a small padlock may be passed for securing the elements together.

12. A support bracket for a battery adapted to be mounted on a bicycle frame or the like, said bracket comprising:
(a) a generally L-shaped frame element of first and second leg members;
(b) means for attaching said first leg member to a support surface;
(c) a generally L-shaped jaw element consisting of first and second leg portions;
(d) means for connecting the first portion of said L-shaped jaw element to the first leg of said L-shaped frame element;
(e) a latching means pivotally connected to the second portion of said L-shaped jaw element for releasably engaging the second leg of said L-shaped frame element to define a generally rectangular space within which a battery may be secured; and,
(f) a pair of diagonally oriented braces arranged on each side of the battery supporting space for restricting the lateral movement of a battery positioned within said bracket.

* * * * *